(12) United States Patent
DiVincent et al.

(10) Patent No.: US 11,210,884 B2
(45) Date of Patent: *Dec. 28, 2021

(54) ELECTRONIC DEVICE OPERATION USING REMOTE USER BIOMETRICS

(71) Applicant: Apple Inc., Cupertino, CA (US)

(72) Inventors: Michael DiVincent, Byron, CA (US); Nicole J. Hollopeter, Kirtland, OH (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 16/546,128

(22) Filed: Aug. 20, 2019

(65) Prior Publication Data

US 2019/0371100 A1    Dec. 5, 2019

Related U.S. Application Data

(63) Continuation of application No. 15/596,186, filed on May 16, 2017, now Pat. No. 10,431,024, which is a
(Continued)

(51) Int. Cl.
*G07C 9/37* (2020.01)
*G06F 21/32* (2013.01)
*G07C 9/26* (2020.01)

(52) U.S. Cl.
CPC .............. *G07C 9/37* (2020.01); *G06F 21/32* (2013.01); *G07C 9/26* (2020.01)

(58) Field of Classification Search
CPC .. G07C 9/37; G07C 9/26; G06F 21/32; G06F 21/34; G06F 21/35; G06F 21/83;
(Continued)

(56) References Cited

U.S. PATENT DOCUMENTS 6,028,950 A    2/2000   Merjanian
6,973,368 B2   12/2005  Schwesig
(Continued)

FOREIGN PATENT DOCUMENTS

CN    1293787    5/2001
CN    1526251    9/2004
(Continued)

OTHER PUBLICATIONS

Uchida, "Fingerprint-based user-friendly interface and pocket-PID for mobile authentication," Proceedings of the 15th International Conference on Pattern Recognition, 2000, vol. 4, pp. 205-209; Digital Object Identifier: 10.1109/ICPR.2000.902896.

*Primary Examiner* — Techane Gergiso
(74) *Attorney, Agent, or Firm* — Brownstein Hyatt Farber Schreck, LLP

(57) ABSTRACT

An electronic device having at least one operational setting, such as a power setting, with at least a first state and a second state. The electronic device may also include an access controller that can receive state data and authorization data from an external source such as a remote control. The access controller may enable a state of the operational setting upon receipt of proper authorization data received from or related to the output from at least one biometric sensor associated with the remote control.

18 Claims, 4 Drawing Sheets

Related U.S. Application Data continuation-in-part of application No. 14/162,030, filed on Jan. 23, 2014, now abandoned.

(58) Field of Classification Search
CPC .............. H04N 21/4415; H04N 21/422; H04N 21/42201; H04L 63/0861; G08C 2201/61; G08C 2201/92; G08C 2201/91; G08C 2201/93

See application file for complete search history.

(56) References Cited

U.S. PATENT DOCUMENTS

| | | | |
|---|---|---|---|
| 7,065,654 B1 | 6/2006 | Gulick | |
| 7,564,369 B1 | 7/2009 | Adams et al. | |
| 7,890,135 B2 | 2/2011 | Eckhart | |
| 7,925,887 B2 | 4/2011 | Burton | |
| 8,055,001 B2 | 11/2011 | Boguslavskij | |
| 8,192,280 B2 | 6/2012 | Muth | |
| 8,279,049 B2 | 10/2012 | Maier | |
| 8,299,889 B2 | 10/2012 | Kumar et al. | |
| 8,381,239 B2 | 2/2013 | Burton et al. | |
| 8,421,931 B2 | 4/2013 | Park et al. | |
| 8,464,289 B2 | 6/2013 | Pan | |
| 8,553,947 B2 | 10/2013 | Benini | |
| 8,561,889 B2 | 10/2013 | Block | |
| 8,648,692 B2 | 2/2014 | Himmelstein | |
| 8,656,486 B2 | 2/2014 | Hicks et al. | |
| 8,762,687 B2 | 5/2014 | Henry et al. | |
| 8,782,703 B2 | 7/2014 | Beadle et al. | |
| 8,797,465 B2 | 8/2014 | Hardacker et al. | |
| 8,813,108 B2 | 8/2014 | Bi et al. | |
| 8,849,199 B2 | 9/2014 | Shrum et al. | |
| 8,988,192 B2 | 3/2015 | King | |
| 9,053,310 B2 | 6/2015 | Oberheide | |
| 9,160,743 B2 | 10/2015 | Anantharaman | |
| 9,319,726 B2 | 4/2016 | Beadle et al. | |
| 9,418,205 B2 | 8/2016 | Giobbi | |
| 9,455,986 B2 | 9/2016 | Marais | |
| 9,490,700 B2 | 11/2016 | Marien | |
| 9,600,304 B2 | 3/2017 | DiVincent et al. | |
| 9,628,756 B2 | 4/2017 | Edwards | |
| 9,760,383 B2 | 9/2017 | DiVincent et al. | |
| 10,063,776 B2 | 8/2018 | Ayalasomayajula et al. | |
| 10,209,680 B2 * | 2/2019 | Schultz .................. | G08C 17/02 |
| 2003/0028872 A1 | 2/2003 | Milovanovic et al. | |
| 2003/0172283 A1 * | 9/2003 | O'Hara .................. | G08C 23/04 |
| | | | 713/186 |
| 2004/0179692 A1 | 9/2004 | Cheng | |
| 2006/0107281 A1 | 5/2006 | Dunton | |
| 2006/0271791 A1 | 11/2006 | Novack et al. | |
| 2006/0293892 A1 | 12/2006 | Pathuel | |
| 2007/0113165 A1 | 5/2007 | Hsieh et al. | |
| 2007/0132733 A1 * | 6/2007 | Ram .................... | G06F 3/03544 |
| | | | 345/163 |
| 2007/0299670 A1 | 12/2007 | Chang | |
| 2008/0026725 A1 | 1/2008 | Cha | |
| 2008/0059806 A1 | 3/2008 | Kishida et al. | |
| 2008/0163363 A1 | 7/2008 | Mizutani | |
| 2009/0033748 A1 | 2/2009 | Ejima et al. | |
| 2009/0058595 A1 | 3/2009 | Mainguet et al. | |
| 2009/0138907 A1 | 5/2009 | Wiser et al. | |
| 2009/0146779 A1 * | 6/2009 | Kumar .............. | H04N 21/43615 |
| | | | 340/5.31 |
| 2009/0169070 A1 | 7/2009 | Fadell | |
| 2009/0196468 A1 | 8/2009 | Chang et al. | |
| 2009/0251619 A1 | 10/2009 | Seidel et al. | |
| 2009/0316054 A1 * | 12/2009 | Bailey ................ | H04M 1/6066 |
| | | | 348/734 |
| 2010/0052853 A1 | 3/2010 | Hilton | |
| 2010/0082351 A1 * | 4/2010 | Lee ........................ | G08C 19/28 |
| | | | 704/275 |
| 2010/0138914 A1 | 6/2010 | Davis et al. | |
| 2010/0146278 A1 | 6/2010 | Maier | |
| 2010/0157168 A1 | 6/2010 | Dunton et al. | |
| 2010/0171634 A1 | 7/2010 | Liang | |
| 2010/0280334 A1 | 11/2010 | Carlson et al. | |
| 2011/0068897 A1 * | 3/2011 | Yum ................ | H04N 21/42204 |
| | | | 340/5.83 |
| 2011/0121943 A1 | 5/2011 | Morovitz et al. | |
| 2011/0221622 A1 | 9/2011 | West et al. | |
| 2012/0167123 A1 | 6/2012 | Gavita | |
| 2012/0169460 A1 * | 7/2012 | Thumparthy .......... | G07C 9/257 |
| | | | 340/5.52 |
| 2012/0204201 A1 | 8/2012 | Cassidy et al. | |
| 2012/0303476 A1 | 11/2012 | Krzyzanowski et al. | |
| 2012/0314140 A1 | 12/2012 | Wiser et al. | |
| 2013/0067545 A1 | 3/2013 | Hanes | |
| 2014/0122645 A1 | 5/2014 | Brown et al. | |
| 2015/0206366 A1 | 7/2015 | DiVincent et al. | |
| 2017/0256110 A1 | 9/2017 | DiVincent et al. | |
| 2017/0293342 A1 | 10/2017 | Field | |
| 2018/0203986 A1 | 7/2018 | Huang et al. | |

FOREIGN PATENT DOCUMENTS

| | | |
|---|---|---|
| CN | 1972186 | 5/2007 |
| CN | 2932523 Y | 8/2007 |
| CN | 101040358 | 9/2007 |
| CN | 101261504 | 9/2008 |
| CN | 101330386 | 12/2008 |
| CN | 101627396 | 1/2010 |
| CN | 101783063 A | 7/2010 |
| CN | 101796764 | 8/2010 |
| CN | 201965635 U | 9/2011 |
| CN | 102609186 | 7/2012 |
| CN | 102750434 | 10/2012 |
| CN | 102930195 | 2/2013 |
| CN | 102986201 | 3/2013 |
| CN | 204833267 | 12/2015 |
| CN | 105844087 | 8/2016 |
| CN | 105992033 | 10/2016 |
| DE | 10117765 A1 | 10/2002 |
| EP | 1173838 A1 | 1/2002 |
| EP | 2429183 A1 | 3/2012 |
| GB | 2388941 A | 11/2003 |
| JP | 2000244830 A | 9/2000 |
| JP | 2001045580 A | 2/2001 |
| JP | 2006270845 A | 5/2006 |
| JP | 2010087596 A | 4/2010 |
| KR | 20100125484 A | 1/2010 |
| WO | WO 99/054841 | 10/1999 |
| WO | WO 01/091057 | 11/2001 |
| WO | WO 03/050770 | 6/2003 |
| WO | WO 03/053060 | 6/2003 |
| WO | WO 04/055717 | 7/2004 |
| WO | WO 06/043324 | 5/2006 |
| WO | WO 09/038826 | 3/2009 |
| WO | WO 09/132338 | 10/2009 |

* cited by examiner

ELECTRONIC DEVICE OPERATION USING REMOTE USER BIOMETRICS

CROSS REFERENCE TO RELATED APPLICATION

This application is a continuation of U.S. patent application Ser. No. 15/596,186, filed May 16, 2017, and entitled "Electronic Device Operation Using Remote User Biometrics," which is a continuation-in-part of U.S. application Ser. No. 14/162,030, filed Jan. 23, 2014, and entitled "Electronic Device Operation Using Remote User Biometrics," now abandoned, the contents of which are incorporated herein by reference as if fully disclosed herein.

TECHNICAL FIELD

This disclosure relates to electronic device operation and control, and more particularly to operating electronic devices with remote input devices having biometric sensors.

BACKGROUND

Many electronic devices include a plurality of manually controllable features and settings that users may modify from time to time. For example, a television may include operational controls such as power, volume, channel, screen brightness and so on. Other electronic devices such as thermostats may include controls that operate air conditioners, heaters, and fans. Other examples of electronic devices with manually controllable features and settings may include laptop and desktop computers, smart phones, tablet computers, home automation controllers, security systems, vehicles, appliances, televisions, set top boxes, and so on.

Manually controllable features of electronic devices may provide a personalized experience for a user. However, many electronic devices may be intended to be enjoyed by multiple users. For example, multiple members of a household may share a single television. In many cases, preferences may differ from user to user. In some examples, alterations to electronic device settings made by a first user may diminish the quality of the experience of a second user. Furthermore, some electronic devices may include features or options inappropriate for some users to modify or enable.

In many cases, electronic devices may include access limitation features such as passcodes or passwords to prevent inappropriate modification of settings. For example, a television may require a passcode to tune particular channels. In still other examples, a home security system may require a password to cancel a false alarm.

Remembering and correctly communicating passwords or passcodes to enjoy limited access features of electronic devices may diminish the quality of the experience of an authorized user. In certain cases, the user may be additionally frustrated when directed to enter a passcode or password via a small remote control or a compact input panel.

In other examples, a user with limited access may undesirably obtain passcodes or passwords to access features that the user is not permitted to enjoy.

Furthermore, if a password or passcode is lost, forgotten, or discovered, a time-consuming and burdensome re-authorization process may be required of a previously authorized user.

Accordingly, there may be a present need for an electronic device having improved limited access features.

SUMMARY

Embodiments described herein may relate to or take the form of an electronic device having at least one operational setting, such as a power setting, with at least a first state and a second state. The electronic device may also include an access controller that can receive state data and authorization data from an external source such as a remote control. The access controller may enable a state of the operational setting upon receipt of proper authorization data.

In many cases, the state data may include an instruction that corresponds to either the first operational state or the second operational state of the electronic device. For example, the state data may include an instruction to power on a television or, in another embodiment, an instruction to increase the temperature of a thermostat. In another embodiment, the state data may include an instruction to open a garage door or an instruction to deactivate a security alarm. One may appreciate that the state data, instruction, and operational setting may vary substantially from embodiment to embodiment.

In many cases, the authorization data may be at least partially derived from a biometric characteristic of a user seeking to operate the electronic device. For example, the authorization data maybe raw biometric data, such as a fingerprint image. In other examples, the authorization data may be the output of an algorithm using biometrically identifying information as an input. For example, the algorithm may be a message-digest algorithm, an implementation of the advanced encryption standard, or any other one-way encryption or data processing algorithm.

Other embodiments described herein may relate to or take the form of a remote for controlling an operational setting of an electronic device similar to an electronic device described above. The remote may include at least one sensor configured to detect a biometric characteristic of a user. In some examples, a sensor may be a fingerprint sensor or, in other examples, the sensor may be a retina or iris sensor, an electrocardiography sensor, a vein imaging sensor, voice sensor, or any other sensor capable to objectively measure a unique biological characteristic of a user.

The remote may also include a communication controller that is in communication with the electronic device. The remote may also include a processor that is coupled to the sensor and to the communication controller. The processor may be configured to receive and analyze a measurement of similarity between the detected biometric characteristic and a template biometric characteristic.

The template characteristic may be stored within the remote or, in other embodiments, the template may be stored in a different location such as on a server in communication with the processor. Once the measurement of similarity is received, the processor may determine whether the similarity exceeds a certain selected threshold. For example, a perfect match between the template and the detected biometric characteristic may not be required. The threshold may be changed from time to time. The processor may instruct the communication controller to send a signal to the electronic device if the similarity exceeds the threshold.

Other embodiments described herein relate to or take the form of a method of operating a limited access feature of an electronic device including the steps of receiving a signal at least partially corresponding to a biometric characteristic, determining whether the signal includes authorization data, and upon the determination that the signal includes authorization data, measuring a similarity between the authorization data and template authorization data. Thereafter and upon the determination that the similarity exceeds a selected threshold, an instruction may be sent to the electronic device to enable the limited access feature.

BRIEF DESCRIPTION OF THE FIGURES

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

The use of the same or similar reference numerals in different drawings indicates similar, related, or identical items.

DETAILED DESCRIPTION

Figure 1:
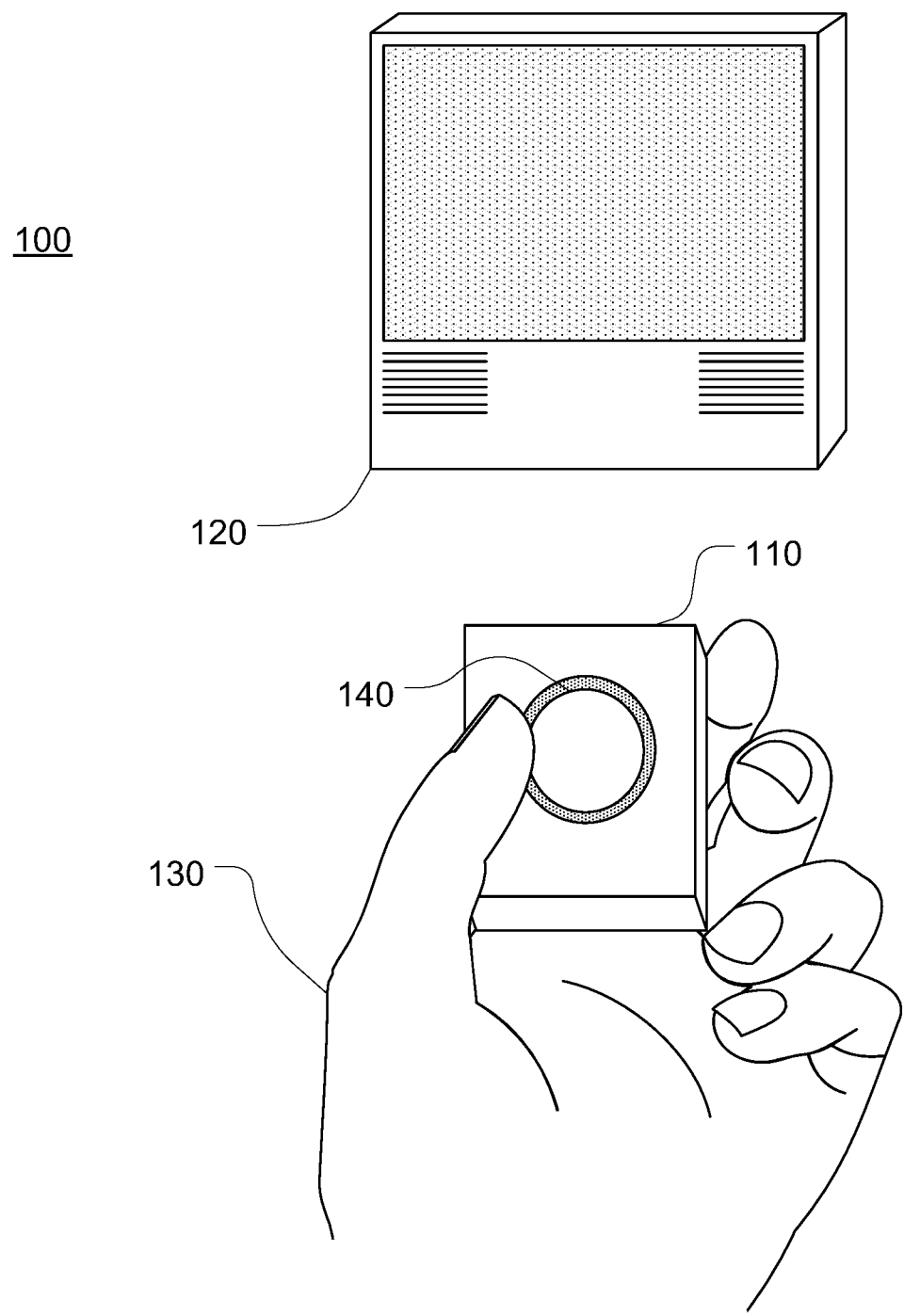
FIG. 1 is an isometric view of a system for operation of limited access features of an electronic device using remotely collected biometric data.

Embodiments described herein relate to methods and devices for operating limited access features of electronic devices with remotely collected biometric data.

As an example, an electronic device may be a television that may include operational controls such as power, volume, channel, screen brightness, and so on. In another example, a thermostat may include controls that operate air conditioners, heaters, and fans. Other examples of electronic devices with operational features and settings may include laptop and desktop computers, smart phones, tablet computers, home automation controllers, wearable devices, heath devices, sports devices, accessory devices, security systems, vehicles, appliances, televisions, set top boxes, and so on.

In these and related examples, an electronic device may include limited access features. For example, a television may require a passcode of a user in order to view particular channels or, in other cases, to turn on the television after or before a certain time of day. In a different example, a thermostat may require a physical key in order to change temperatures or settings. In still further examples, a home security system may require an access code in order to arm or disarm a system. Other electronic devices may have other limited access features.

In certain embodiments, an electronic device may include an access controller that prevents or allows modification of limited access features of the electronic device. The access controller may distinguish between candidate users, approved users, and denied users. As used herein, a 'candidate user' includes all unknown users of an electronic device. As used herein, an 'approved user' or 'authorized user' includes all users who are permitted to access and operate limited access features of an electronic device. Similarly, as used herein a 'denied user' or 'unauthorized user' includes all users who are not permitted to access or operate limited access features of an electronic device.

In some embodiments, the access controller may receive both state data and authorization data from an external source, such as a remote control for a television. For example, state data may include an identification of limited access channel the candidate user requests and the authorization data may include data that affirmatively identifies the candidate user as an approved user. For example, in certain embodiments, authorization data may be an access code. In other cases, the authorization data may include information to identify the approved user. In still further cases, the authorization data may include information that is associated with an approved user group.

Other embodiments described herein may identify a candidate user as an authorized user by means of remotely collected biometric data. In some cases, the biometric data may be derived from or related to the output of a sensor configured to detect an objective biometric characteristic of a candidate user. For example, the sensor may be a fingerprint sensor that may detect the unique arrangement of ridges and valleys of a candidate user's fingerprint. In another example, the sensor may be a retina or iris sensor that may detect unique variations in the structure of a candidate user's eye. Other examples of biometric sensors may include electrocardiography sensors, vein imaging sensors, voice sensors, optical sensors, pyroelectric sensors, or any other sensor capable of objectively measuring a unique biometric characteristic of a user.

In other examples, more than one sensor and/or more than one sensor type may be used cooperatively to affirmatively identify a candidate user as an authorized user from multiple, separately measured, biometric characteristics. For example, in certain embodiments multiple fingerprint sensors may be used to identify a candidate user by multiple fingerprints. In another example, the output from a fingerprint sensor and the output from a vein imaging sensor may be used to identify a candidate user by both a fingerprint and a vein pattern. In this manner, the term 'sensor' may be understood to encompass both single and multi-sensor embodiments. In some cases, multiple sensors of different biometric identification types may be used either independently or collaboratively to provide a biometric identification of a candidate user.

The biometric sensor may be included within a portable remote that is in communication with the electronic device the candidate user seeks to operate. For example, the sensor may be included in a remote control for a television or, in other examples, the sensor may be included within a control panel for use with a home automation system. In still further examples, the sensor may be included within a multi-function portable electronic device such as a smart phone, wearable device, health monitor, or other similar device. In each of these and related embodiments, the portable remote may receive biometric data from the biometric sensor which may be compared against template biometric data in order to affirmatively identify a candidate user as an approved user or, in the alternative, to identify the candidate user as a denied user. The template biometric data may be previously recorded or otherwise collected from an authorized user during a training process. For example, the template data may be a previously-measured fingerprint of an authorized user.

In many related embodiments, a similarity measurement between the measured biometric data and a template biometric data may be determined. In many examples, the similarity measurement may be linear. For example, if measured biometric data is identical to template biometric data, then the similarity measurement may be equal to 100. In another example, if measured biometric data only matches half of the template data (e.g., partial fingerprint match) the similarity measurement may be equal to 50. In another example, if measured biometric data only matches a very small portion of template data, the similarity measurement may be equal to 10. The algorithm, method, or process selected for determining similarity between measured and template biometric data may differ from embodiment to embodiment, sensor to sensor, or template to template. Different scales and methods of measurement and/or analysis of similarity may be used in different embodiments. For example, a logarithmic scale may be used to measure similarity in certain embodiments.

Once the measurement of similarity is calculated, determined, or otherwise derived, certain embodiments may ascertain whether measured similarity exceeds a certain selected threshold. In certain embodiments, the threshold for the measured similarity between measured and template biometric data may be set such that if the threshold is exceeded, measured biometric data may be approved. In this manner, the threshold may define the confidence level required to affirmatively identify a candidate user as an approved user associated with a particular template.

For example, a threshold may be set to be 90 such that measured biometric data is approved only when it varies from the template biometric data by less than 10. In another example, a threshold may be set to be 51 such that measured biometric data is approved only when it varies from the template biometric data by no more than 49. It should be appreciated that the 100 point scale given is merely an example. In certain embodiments, the matching of the measured biometric data against a template may be determined without reference to any numerical scale. For example, the match may depend on matching one or more features of biometric data rather than a certain percentage or relative amount.

In certain embodiments, the selected threshold may be set to at least partially account for errors in sensor and/or similarity measurements. For example, if the output from a particular similarity measurement algorithm is known to have error, the threshold may be selected specifically to reduce the probability of a false approval. As used herein, a 'false approval' or 'false positive' includes identifying a candidate user as an approved user when in fact the candidate user should be identified as an unauthorized user. By selecting a high threshold, the approved user may be confident that a candidate user is highly unlikely to be mistaken as an approved user.

Although reducing the probability of a false approval, high thresholds may result in an increase in false rejection of approved users. As used herein, a 'false rejection' includes identifying a candidate user as an unauthorized user when in fact the candidate user should be identified as an authorized user.

For example, a measured similarity of 80 does not exceed a threshold of 90, and is not approved. This may be an example a false rejection if the candidate user was in fact an authorized user. Similarly, a measured similarly of 55 does not exceed the threshold of 90. This may be an example of a true rejection if the candidate user was in fact an unauthorized user.

On the other hand, both measured similarities of 55 and of 80 may be approved with a threshold of 51. In this case, the candidate user with a similarity at 80 is approved. This may be an example of a true approval if the candidate user was in fact an authorized user. In addition, the candidate user with a measured similarity of 55 may constitute a false approval if the candidate user was in fact an unauthorized user.

In this manner, lowering the threshold may allow for decreasing the chances of false rejection at the expense of increasing the chances of false approval. Similarly, raising the threshold may allow for decreasing the chances of false approval at the expense of increasing the chances of false rejection.

In certain embodiments, an authorized user may select a different threshold to associate with different limited access features of an electronic device. For example, a user may desire to limit access to certain television channels and access to a maximum volume. In such a case, a user may determine that false positive for high volume may be less troublesome than a false positive for selecting an unauthorized channel. Similarly, the user may find that a false rejection of requested access to high volume may be more irritating than a false rejection of requested access to an unauthorized channel. In other cases, the threshold may be changed from time to time or, in the alternative, or may change from limited access feature to limited access feature.

FIG. 1 is an isometric view of a system 100 for operation of limited access features of an electronic device 120 using remotely collected biometric data. The system 100 may include an electronic device 120 and a remote control device 110. The remote control device may be in communication with the electronic device 120, and may be operable to transmit one or more instructions to the electronic device. For example, the remote control 110 may include a wireless communication component that is compatible with a wireless communication component included within the electronic device 120. For example, the wireless communication component may use infrared, visible light, sound, Wi-Fi, Bluetooth, near-field communication, power line transmission, radio, or any other suitable wireless communication protocol or method.

Electronic device 120 is illustrated as a television as an example only. In various implementations the electronic device may be any electronic device that is capable of receiving instructions from a remote control device. Such electronic device may include one or more televisions, set top boxes, media centers, desktop computing devices, media controllers, media players, laptop computing devices, wearable devices, tablet computing devices, mobile computing devices, cellular telephones, smart phones, kitchen appliances, automobiles, voice over internet protocol telephones, displays, microphones, speakers, video game console, HVAC (heating, ventilation, and/or air conditioning) systems, lighting systems, and/or any other electronic device(s).

Similarly, the remote control device 110 is illustrated as a dedicated remote control with a single control element 140 as an example only. In various implementations and embodiments, the remote control device may be any remote control device that is capable of transmitting instructions to the electronic device 120. Such a remote control device may include one or more portable electronic devices, such as dedicated remote control device, a portable electronic device, a smart phone device, a tablet device, a stylus device, a wearable device, a health monitor, or any other suitable electronic device.

The remote control device 110 may include at least one sensor 140 that is configured to detect at least one biometric characteristic from a candidate user 130. As illustrated, the sensor may be a fingerprint sensor (such as a capacitive sensor, an ultrasonic sensor, and/or other touch sensor) that is operable to detect at least one fingerprint. However, a fingerprint sensor is merely shown as an example. The sensor 140 may include any number of biometric sensors capable to detect biometrical characteristics from the candidate user 130. For example, in certain embodiments, the sensor 140 may be a retina or iris sensor, an electrocardiography sensor, a vein imaging sensor, voice sensor, or any other sensor capable to objectively measure a unique biometric characteristic of the candidate user 130.

In other implementations, the sensor may be any kind of sensor (such as one or more cameras, inertial sensors, photoplethysmographic sensors, and so on) that is operable to detect at least one unique biometric characteristic of the candidate user. Such biometric characteristics may include, but are not limited to, retinal or facial images, palm prints, gesture patterns, signatures, and/or any other kind of unique biometric characteristics of the candidate user. In still further embodiments, the remote control device 110 may include more than one element sensor element 140. For example, the remote control device may include a number of buttons or sensors, each capable to cause an instruction to be sent to the electronic device 120. Such instructions may include state information and/or authentication information.

In these and related embodiments, the sensor element 140 may receive biometric data which may be compared against template biometric data in order to affirmatively identify a candidate user 130 as an approved user or, in the alternative, to identify the candidate user as a denied user. The template biometric data may be previously recorded or otherwise collected from an authorized user during a training process. For example, the template data may be a previously-measured fingerprint of an authorized user.

In some embodiments, the remote control device 110 may include memory in which multiple templates may be stored. In these and related cases, each template may be compared against the biometric data returned by the sensor element 140 when the sensor element 140 is engaged by a candidate user 130.

For example, the remote control device 110 may include a memory which stores up to ten separate template data. When a candidate user 130 engages the sensor element 140, the sensor element 140 may measure biometric data associated with the candidate user. The candidate biometric data may next be compared against the ten separate template data. As noted above, the comparison of candidate biometric data to any particular template biometric data may include measuring a similarity therebetween.

Once the measurement of similarity is calculated, determined, or otherwise derived, certain embodiments may ascertain whether measured similarity exceeds a certain selected threshold. As noted above the threshold may be fixed, variable, or otherwise editable by the end-user. In some embodiments, a threshold may vary from limited access feature to limited access feature.

By way of the first example, a candidate user may hold a remote control device having a fingerprint sensor. The sensor may be positioned anywhere along the outer surface of the remote. For example, the sensor may be positioned on a bottom surface of the remote or, in another example, the sensor maybe positioned on a top surface of the remote. Upon grasping the remote, the candidate user's finger may align with the fingerprint sensor. Thereafter, the remote may detect that a finger is present along the sensor surface and may begin comparing the fingerprint against template fingerprints stored within the remote. This process may authenticate the candidate user as an authorized user.

In this example, when the authenticated user operates another feature of the remote, the authenticated user may already be authenticated to operate that feature. However, if another user were to hold the remote and alight his or her fingerprint with the sensor, the remote may determine that the second user is not an authorized user. Thereafter, the second user may not be permitted to access certain features of remote. For example, a parent maybe an authorized user of a television remote such that when the parent handles the remote and aligns a finger with a fingerprint sensor, the remote may determine that the parent is an authorized user. Thereafter, the parents may be able to access limited access features of the television without being prompted for a security or authorization code.

On the other hand, a child may be user with only limited access. If a child grasps the remote and aligns a finger with a fingerprint sensor of the remote, the child may not be permitted to access certain limited-access features of the television (or other electronic device) by operating the remote. If the child attempted to access the limited access features of the television, the television may prompt the child to enter the proper access code.

In these and related examples, a remote may send both state data and authentication data to an electronic device. For example, when a parent operates a television with a remote control having a biometric sensor, the remote control may send both the state data and the authorization data to the television upon every button press that the parent makes. In one embodiment, every feature of the remote control may cause to be sent and instruction and an authorization. For example, if a power button on the remote is pressed, and instruction to turn a television on may be accompanied by an authorization data that identifies the user making the request of the television. In many cases, powering on the television may not be a limited access feature. Thus, the television may ignore the authentication data sent after the instruction. However, when a limited access feature is attempted to be accessed, the television may pass the authorization data to an access controller to determine whether the authorization data permits access to the requested feature.

In other embodiments the authorization data may be uniform for a particular feature. In other words, authorization data used to access the power feature of the television may be the same for every user. In such an example, the electronic device may be entirely unaware of the identity of a particular user.

In another example embodiment, the authorization data may include biometrically identifying information that confirms the identify of a user. For example, if a user selects a button to make a purchase of content displayed on the television (e.g., pay-per-view movie), the remote may send to the television information that authenticates the identity of the user associated with one or more purchase accounts.

In still further embodiments, the remote may send biometrically identifying information to a third electronic device. For example, the third electronic device may be an authentication server in communication with both the remote and the television. In this manner, the remote may not necessarily to identify a particular user but instead may offload the authentication process to the third electronic device.

Figure 2:
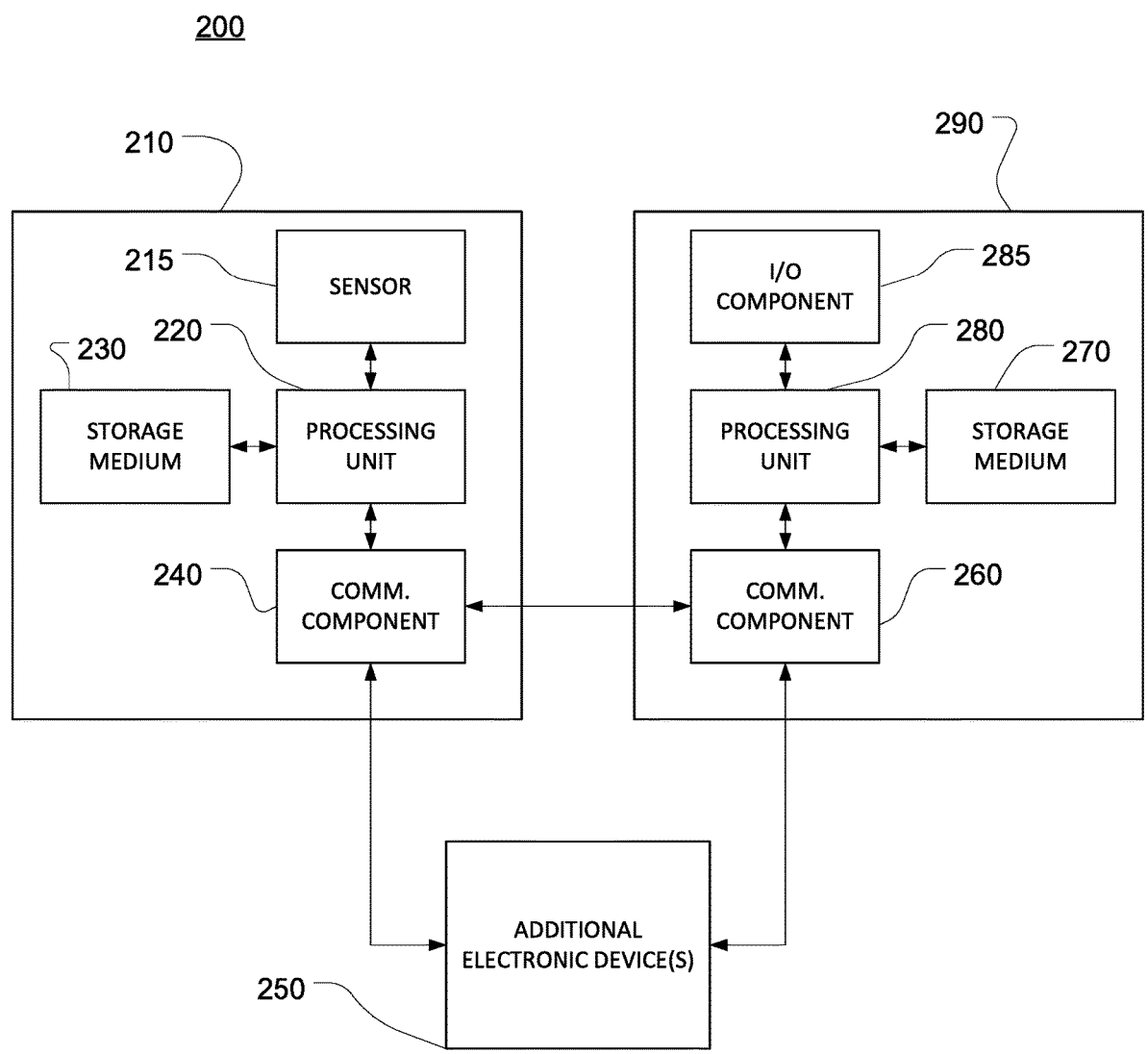
FIG. 2 is a block diagram illustrating a sample of functional relationships of the embodiment shown in FIG. 1.

FIG. 2 is a block diagram illustrating the functional relationships 200 of components of the system 100 of FIG. 1. The remote control device 210 and the electronic device 290 may be operable to communicate with each other and/or with one or more additional electronic device(s) 250 (such as one or more computing devices configured in a cloud computing configuration) via one or more wired, wireless, local, and/or network communication connections.

As illustrated, the remote control device 210 may include one or more sensors 215, one or more processing units 220, one or more storage media 230 (which may take the form of, but may not be limited to, a magnetic storage medium, optical storage medium, magneto-optical storage medium, read only memory, random access memory, erasable programmable memory, flash memory, and so on), and/or one or more communication components 240 (such as one or more wired and/or wireless communication components including, but not limited to, one or more Bluetooth communication components, Wi-Fi communication components, infrared communication components, Ethernet communication components, and so on) that may be utilized to communicate with the electronic device 290 and/or the additional electronic device(s) 250.

As also illustrated, the electronic device 290 may include one or more processing units 280, one or more storage media 270, one or more communication components 260 that may be utilized to communicate with the remote control device 210 and/or the additional electronic device(s) 250, and/or one or more input/output components 285 (such as one or more displays, speakers, microphones, touch screens, touch pads, keyboards, virtual keyboards, mice, printers, and/or any other input/output device and/or input/output device interface).

Although the remote control device 210 and the electronic device 290 are illustrated and described as including particular components such as processing units 220 and 280, it is understood that these are examples. In various cases, the remote control device and/or the electronic device may include various arrangements of the same, similar, and or different components without departing from the scope of the present disclosure.

Figure 3:
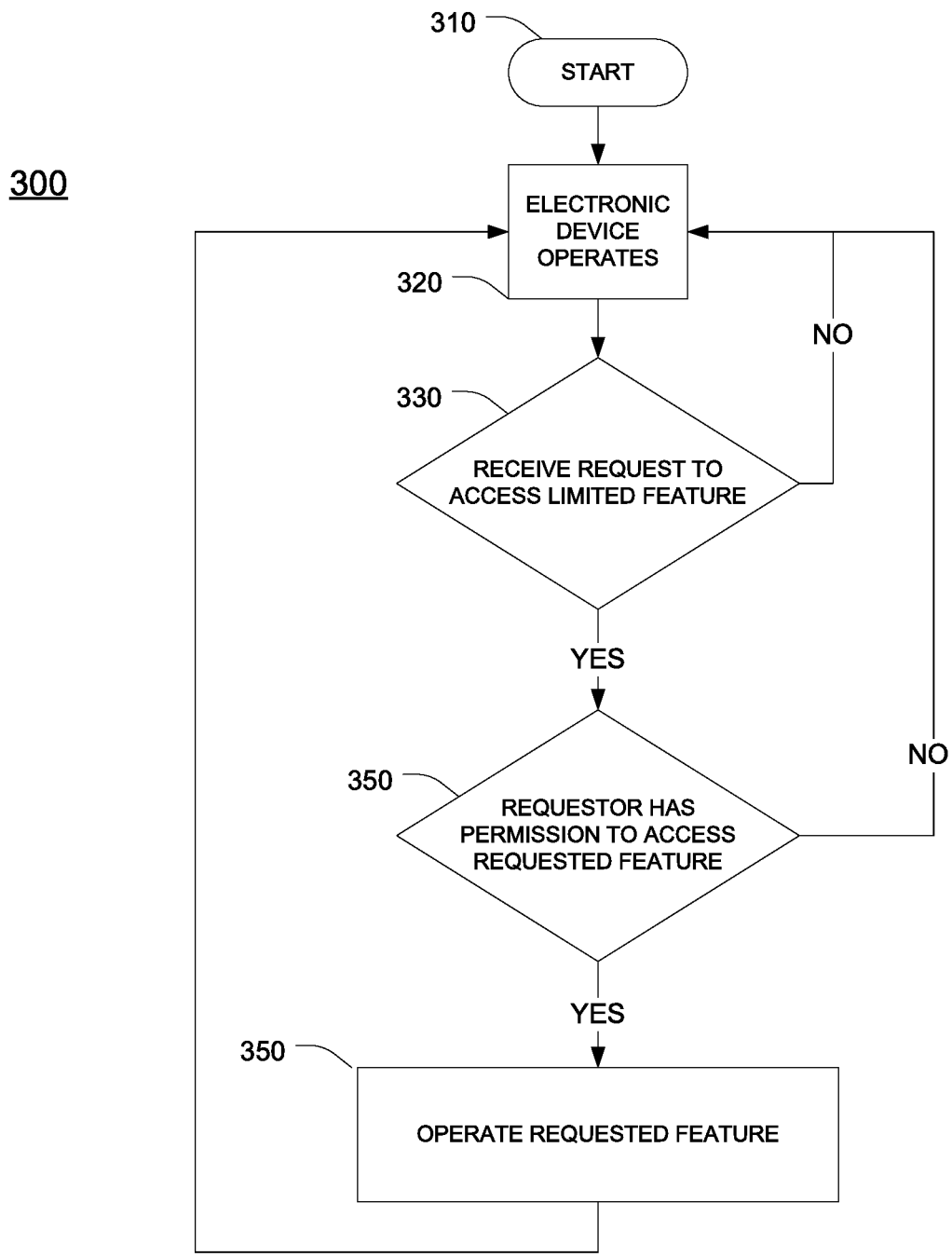
FIG. 3 is a flow chart illustrating a method of operating limited access features of an electronic device.

FIG. 3 is a flow chart illustrating a method 300 of operating limited access features of an electronic device. The method may start at block 310, proceeding to block 320 in which the electronic device may operate. During operation at 320, the electronic device may receive a request to access a limited feature at 330. Thereafter, the electronic device may determine whether the requestor (i.e., candidate user) has permission to access the requested feature at block 350. If the requestor is permitted to operate the requested feature, the electronic device may operate the requested feature at 350, thereafter continuing to operate at 320. In the alternative, if the user does not have permission to access the requested feature, the electronic device may ignore the request and continue to operate at 320. In some embodiments, this method may be performed by the electronic device 120 as shown in FIG. 1.

Figure 4:
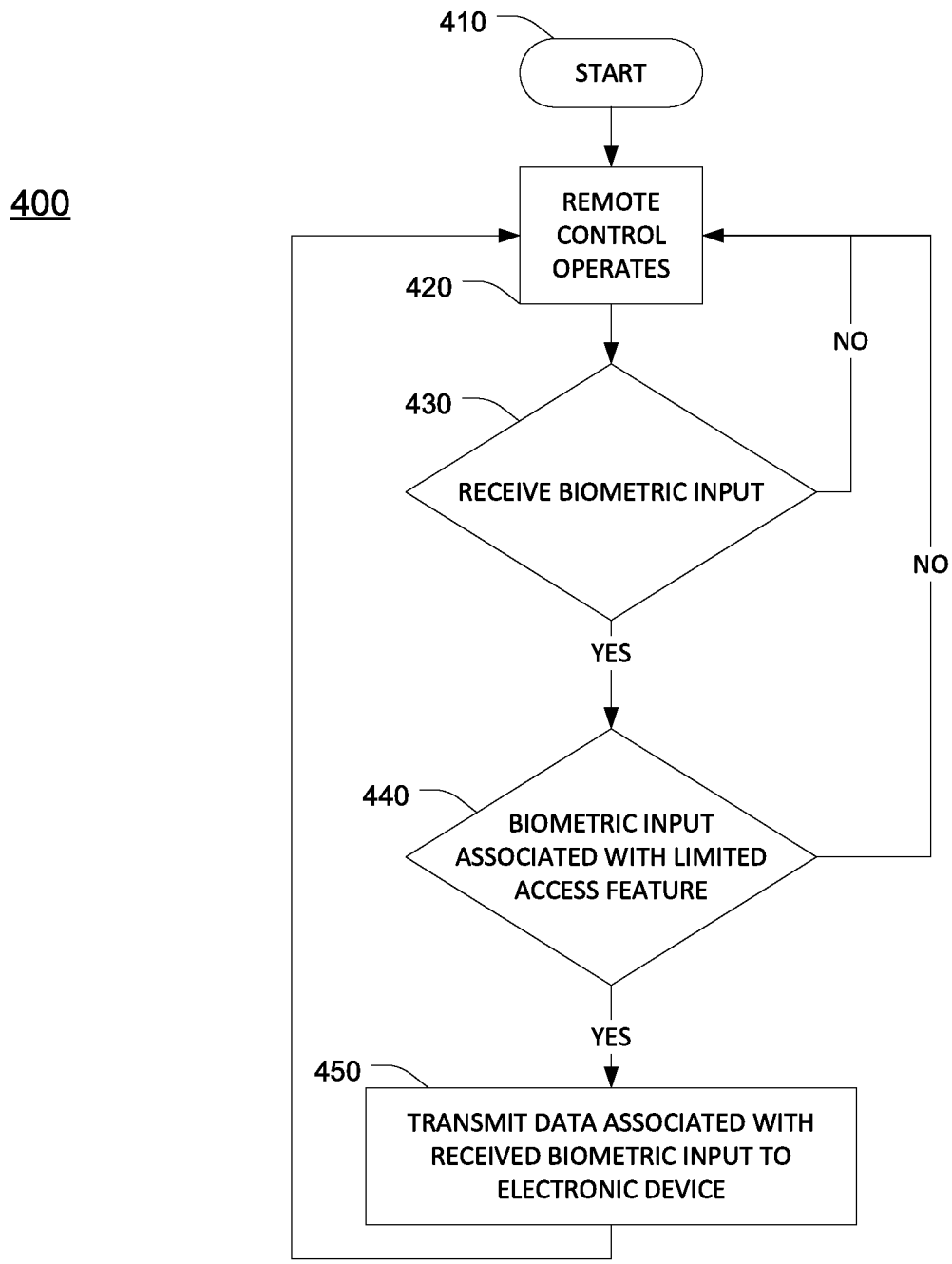
FIG. 4 is a flow chart illustrating a method of using biometric characteristics to operate limited access features of an electronic device.

FIG. 4 is a flow chart illustrating a method 400 of using biometric characteristics to operate limited access features of an electronic device. The method may start at block 410, proceeding to block 420 in which the remote control may operate. During operation at 420, the remote control may receive biometric input from one or more sensors at 430. Thereafter, the remote control may determine whether the data (i.e., candidate user biometric data) is associated with a limited access feature at block 450. If the data is associated with a limited access feature, the remote control may transmit the data associated with the received biometric input to the electronic device at 440, thereafter continuing to operate at 420. In the alternative, is not associated with a limited access feature, the remote control may ignore the data and continue to operate at 420.

One may appreciate that although many embodiments are disclosed above, that the operations presented are meant as exemplary and accordingly are not exhaustive. One may further appreciate that alternate step order or, fewer or additional steps may be required or desired for particular embodiments.

Where components or modules of the invention are implemented in whole or in part using software, in one embodiment, these software elements can be implemented to operate with a computing or processing module capable of carrying out the functionality described with respect thereto.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

What is claimed is:

1. An electronic device, comprising:
a processor programmed to instantiate an access controller, the access controller configured to:
receive, from an external control device, a transmission comprising both:
an instruction to transition the electronic device from a first state to a second state; and
authorization data that was at least partially derived from a biometric characteristic of a user as a user input corresponding to the instruction was provided to the external control device;
determine the instruction requires access to a limited access operating mode;
responsive to determining that the instruction requires access to the limited access operating mode, determine the authorization data is associated with an authorized user of the limited access operating mode; and
only after determining that the authorization data is associated with the authorized user, initiate execution of the instruction; wherein:
the limited access operating mode comprises at least one of a power mode, a volume mode, or a hardware setting of the electronic device.

2. The electronic device of claim 1, wherein the biometric characteristic comprises a fingerprint.

3. The electronic device of claim 1, wherein the authorization data includes biometric information of the user.

4. The electronic device of claim 3, further comprising an authentication controller configured to measure a similarity between the received biometric information and a template biometric information.

5. The electronic device of claim 4, wherein the authentication controller is configured to instruct the access controller that the similarity exceeds a selected threshold.

6. The electronic device of claim 5, wherein the selected threshold is modifiable by the user.

7. A remote for controlling an operational setting of an electronic device, the remote comprising:
a button;
a sensor configured to detect a biometric characteristic of a user;
a communication controller in communication with the electronic device; and
a processor coupled to the sensor and coupled to the communication controller, the processor configured to:
detect a press of the button;
operate the sensor to detect an instance of the biometric characteristic while the button is being pressed;
associate the press of the button with a transition of the electronic device from a first state to a second state;
receive a measurement of a similarity between the detected instance of the biometric characteristic and a template biometric characteristic; and
instruct the communication controller to send a signal including both an instruction to transition the electronic device from the first state to the second state, and authorization data that identifies the user, when the similarity exceeds a selected threshold;
wherein each of the first state and the second state are associated with at least one of a power setting or a hardware setting of the electronic device.

8. The remote of claim 7, wherein the biometric characteristic comprises a fingerprint.

9. The remote of claim 7, wherein the authorization data includes biometric information of the user.

10. The remote of claim 7, wherein the selected threshold is modifiable by the user to provide a first threshold for a first operational setting input and a second threshold for a second operational setting input.

11. The remote of claim 7, wherein the processor is in communication with an authentication controller configured to measure the similarity.

12. The remote of claim 11, wherein the authentication controller comprises a server in communication with the processor.

13. The remote of claim 11, wherein the authentication controller comprises a second electronic device in communication with the processor.

14. A method for operating an electronic device, the method comprising:
receiving, from an external control device, a transmission comprising both:
an instruction to transition the electronic device from a first state to a second state; and
authorization data that was at least partially derived from a biometric characteristic of a user as a user input corresponding to the instruction was provided to the external control device;
determining the instruction requires access to a limited access operating mode;
responsive to determining that the instruction requires access to the limited access operating mode, determining the authorization data indicates access to the limited access operating mode is associated with an authorized user of the limited access operating mode; and
only after determining that the authorization data is associated with the authorized user, initiating execution of the instruction and switching the electronic device from the first state to the second state; wherein:
the limited access operating mode comprises at least one of a power mode, a volume mode, or a hardware setting of the electronic device.

15. The method of claim 14, wherein the biometric characteristic comprises a fingerprint.

16. The method of claim 14, wherein the authorization data includes biometric information of the user.

17. The method of claim 16, further comprising measuring a similarity between the received biometric information and a template biometric information.

18. The method of claim 17, wherein the authorization data indicates access to the limited access operating mode when the similarity exceeds a selected threshold.

* * * * *